July 30, 1957     P. A. T. KEEPING     2,801,162
PROCESS AND APPARATUS FOR COOLING MOLTEN METAL Filed June 11, 1953     3 Sheets-Sheet 3

Inventor
Patrick Alexander Tempest Keeping
By Pennie, Edmonds, Morton, Barrows & Taylor
Attorneys

United States Patent Office 2,801,162
Patented July 30, 1957

2,801,162

PROCESS AND APPARATUS FOR COOLING MOLTEN METAL

Patrick Alexander Tempest Keeping, Lockleaze, Bristol, England, assignor, by mesne assignments, to Metallurgical Processes Limited and The National Smelting Company Limited, doing business as Metallurgical Development Company, Nassau, Bahamas Application June 11, 1953, Serial No. 361,041

Claims priority, application Great Britain June 16, 1952

10 Claims. (Cl. 75—63)

This invention relates to an improved process for cooling molten metal and to apparatus therefor.

In previous methods of cooling molten metal, e. g. those non-ferrous metals obtained from smelting furnaces, water circulating through pipes in contact with the molten metal has been used as the cooling agent.

This method of operation provides no convenient method of controlling the rate at which heat is abstracted from the molten metal. If at any time during the operation or after a shut down, the molten metal is not so hot as it is normally, so that cooling it will cause it to solidify, it is impracticable to stop temporarily the heat abstraction by running the water out of the pipes, since if this were done, these pipes would be heated far above the boiling point of water and, on readmission of water, steam would be violently generated.

Instead of running out the water, therefore, the whole cooling apparatus has to be removed from the molten metal, if solidification of the molten metal is to be avoided. Also, because of the thin-walled piping which has to be used, in order to obtain good heat transfer, leaks are common and the water coming into contact with the molten metal is converted with explosive violence into steam.

The invention consists of a method of cooling molten metal in which the molten metal is passed through a trough or launder having cooling sections located therein.

The invention further consists of a method of separating molten metals in a solution, in which the solution is cooled by passing through a trough or launder having cooling sections located therein, and is then passed to a quiescent body to complete separation of the metals.

Preferably the cooling sections mentioned in the two preceding paragraphs are located at the upper parts of the troughs or launders and heat-insulating material is located in the lower part thereof.

The invention further consists of a method of separating zinc from a solution in lead in which the solution is cooled by passing through a trough or launder to a temperature above the monotectic temperature (418°) for a zinc-lead mixture and is then passed to a quiescent body to complete the separation of the metals.

The invention further consists of a trough or launder for cooling molten metal comprising a trough of steel plate, a base of cement or the like material of low thermal conductivity within the steel trough and a water-cooling device on the inside of the steel plate trough above the cement base.

The invention further consists of a trough or launder comprising a plurality of trough sections of steel plate secured together by means of end flanges, a base of cement or like material of low thermal conductivity extending within the trough, and water cooling devices on one or both of the insides of the trough above the level of the cement base.

The invention further consists of a cooling trough or launder for cooling molten metal having a lower insulating part in which substantially no cooling occurs and cooled upper side walls.

The invention further consists of a method of constructing a cooling trough or launder, comprising forming an outer trough wall, forming therein a cement mixture and shaping to provide a thick layer over the lower part of the trough and a thin layer over the upper side walls of the trough, and securing water cooling jackets over the upper cement side walls.

The invention further consists of a method of controlling the cooling of molten metal in which the metal is passed through a trough or launder having cooling sections located in the upper part thereof and the level of the metal in the trough or launder is controlled so as to be below the level of the cooling section, or so as to extend to any desired height up the cooling sections, depending on the amount of cooling desired.

The invention will be made clearer by referring to an embodiment shown in the accompanying drawings in which:

Figure 4 is a side elevation of one of the sections forming the trough;

Figure 7 a T-spade.

Figure 2:
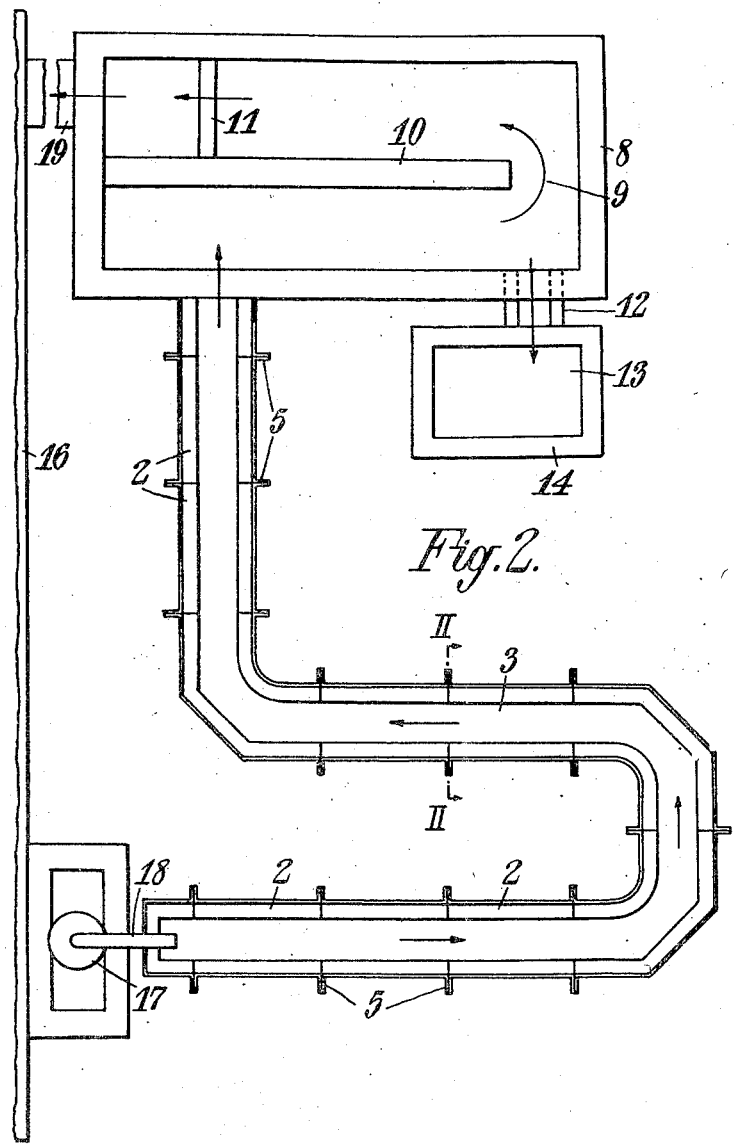
Figure 2 is a plan view of the layout.
Figure 5:
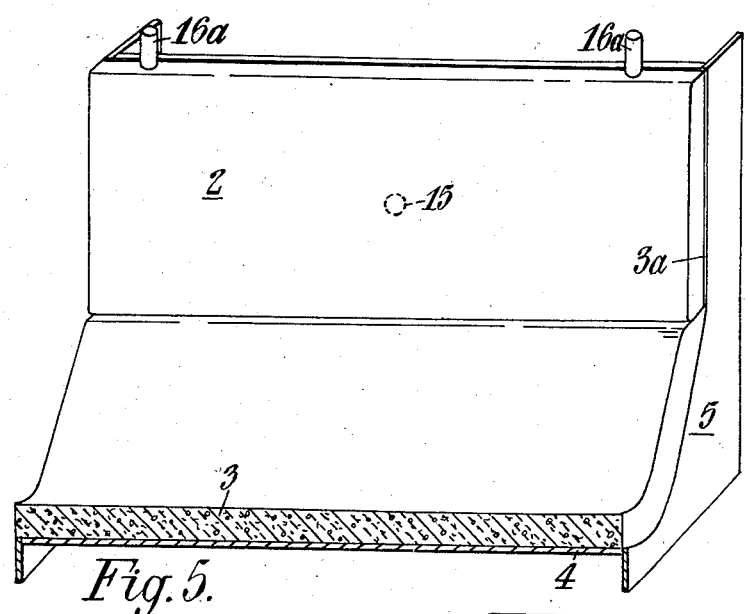
Figure 5 is a cut-away perspective view of the trough and cooling apparatus.

The trough or launder as shown in Figure 2 is made up of many sections, each comprising a steel plate frame 4 with end flanges 5, some sections having one or two water-cooling jackets 2. A base 3 of heat insulating material such as cement extends in one piece all along the troughs underneath the water jackets 2, although it could be sectionalised if desired.

Adjacent sections are secured together by bolting together the adjacent flanges with a layer of asbestos in between.

Cement is poured into the trough 4 after placing formers therein to define the inner surface. It may be allowed to rise up to the top of the launders. The shape of the solid cement is that of the launders from the bottom up to the level of the water jackets, the cement being hollowed out, all as shown in the figures. Above the bottom of the water jackets the cement if it has been allowed to rise up to the top of the launders forms a vertical layer 3a thin enough to accommodate the water jackets on the inside, resting on the cement base, so that the water jackets project inwardly only to the same extent that the top of the cement base does. A hole is cut in the upper cement layer 3a for bolts 15, for securing the water jackets to the trough 4.

Figure 1:
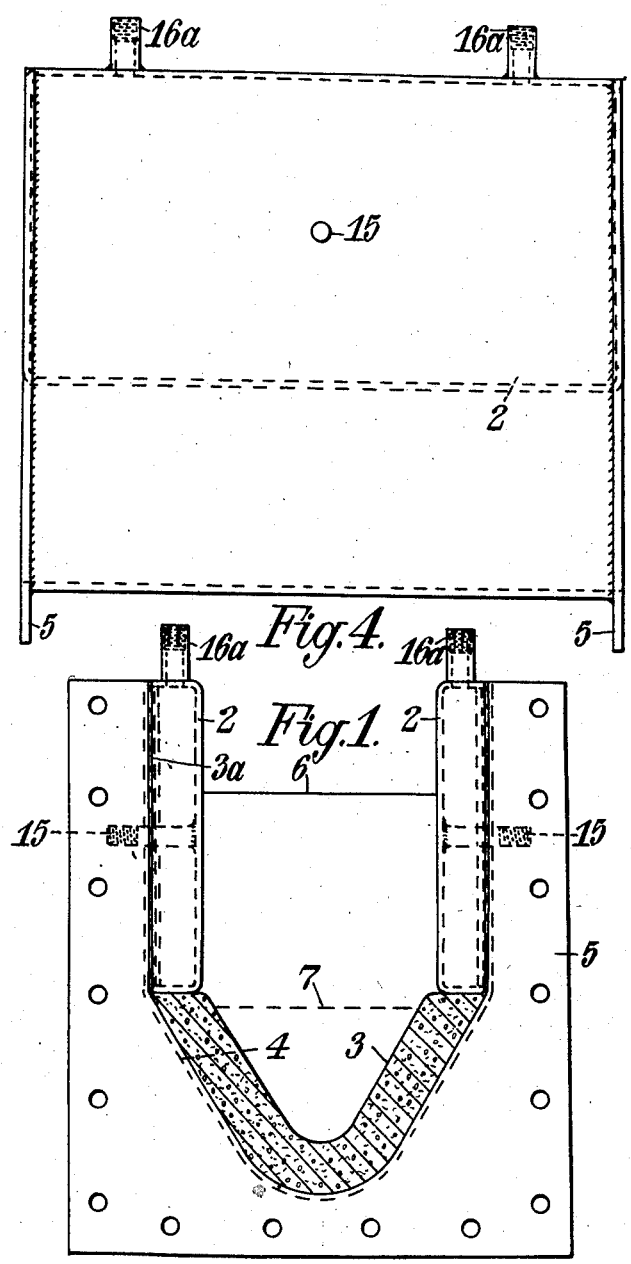
Figure 1 is a vertical section of the trough and cooling device on the line II—II of Figure 2.

When the plant producing the molten metal is working normally, the molten metal passes along the trough in the direction shown by arrows in Figure 2, and at a height which is above the lower level of the water cooling jackets, e. g. at level 6 in Figure 1.

In a particular example, the molten metal, zinc in lead, comes into the trough from a zinc condenser 16 of the kind described in British Patent No. 572,961, in which zinc vapour is condensed by shock-chilling with a shower of molten lead. The metal is pumped up by means of pump 17 and poured by means of pipe 18 into one end of the trough. The cooling in the trough is such that the temperature of the molten metal remains above the monotectic temperature (418° C.) for a zinc-lead mixture and this, combined with the actual proportion of zinc present in the lead, ensures that the zinc, when it separates, will be molten.

The separation of the zinc actually occurs in the launders and in the separating tank 8, in which latter the velocity of the metal is reduced sufficiently for this separation to be completed, the almost pure zinc floating to the top of the lead. The metal layers, as a slowly moving pool 9, round the partition 10. The baffle 11 is arranged at such a depth that the upper layer, i. e. of zinc, can progress no farther and flows out by a pipe 12 to form another pool 13 of almost lead-free zinc, inside the tank 14. The lower layer of lead is returned to the condenser 16 by the passage 19.

Figures 3, 6, 7:
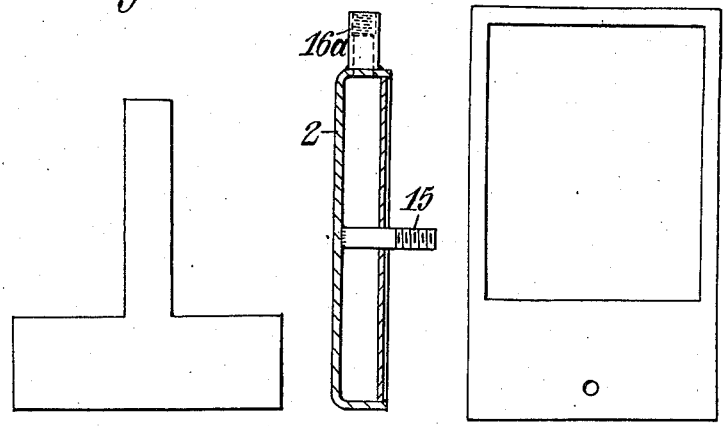
Figure 3 is an enlarged vertical section of one of the water cooling jackets.
Figure 6 shows a main spade.

The molten metal in the trough is kept up to the required height by a weir or mainspade, Figure 6. The section of the trough adjacent to the tank 8 is square, and the mainspade is placed at the end of the trough adjacent to this tank. At this point a water-cooled jacket (not shown) is located in the walls of the tank just beyond the spade and this jacket makes contact with the spade to give good heat transfer from it, so that any liquid metal creeping round the edges of the spade is solidified and forms an impasse. This impasse serves to keep the spade firmly in position.

The mainspade has a hole a little way above its bottom edge. There are two reasons for this. Firstly, when closing down, the last remnants of liquid in the trough can be drained off. This, of course, prevents solid material forming at the bottom.

Secondly, as the metal above the level of the bottom of the water jackets cools, it tends to change places with the hotter metal below. The hole collects metal from the bottom of the trough to even this balance. For fine control of metal height a T-spade, Figure 7, can be placed up against the main spade and this T-spade submerged to the desired level. Of course any other arrangement for adjusting the height of the metal in the trough can be used.

It is desirable that a state of turbulence should be created in the molten metal in the trough.

The effect of turbulence is two-fold. Firstly, it gives the metal an internal velocity which adds itself on to the overall velocity of the metal. The metal therefore moves more quickly against the water jackets, and thus more heat is extracted per given area of cooling surface. Secondly, the state of affairs that would pertain when metal is being cooled, if there were no turbulence, would be one in which the cooler metal changes place with the hotter, so that the metal at the bottom is the cooler. In the case of a solution of zinc in lead when the bottom metal reaches the monotectic temperature, the metal as a whole must not be cooled further, otherwise some of the bottom metal will precipitate solid zinc. Therefore the final temperature attained by the metal when it mixes together in the separating tank is sometimes not as low as desired. With turbulence, the temperature at all points in the metal is about the same, and therefore none of the metal cools to 418° C. (the monotectic temperature). A lower overall final temperature of the metal by the time it reaches the separating tank can thus possibly be attained, because the metal level can now be raised so that the metal can be cooled more by the water jackets. This second effect of turbulence is similar to the effect of the hole in the mainspade.

Various devices have been used to promote turbulence. The ones used most consist simply of spades of similar shape to the shape of the launder, fins projecting inwards from the side of the trough, or a rod with vertical non-parallel dependent metal plates. By immersing the last-mentioned in the molten metal it causes it to change direction rapidly and thus promotes turbulence.

Any turbulence producing devices increase dross formation. This latter trouble can, however, be diminished by having a roof which can be fitted over the top of the trough, to reduce the action of the air on the zinc. With this safeguard, the turbulence producing devices can be used with more confidence. Alternatively, if the roof, but not the turbulence producing device, is used, then dross formation is kept down to a very low level.

When the furnace is shut down, no heat is being supplied to the metal in the condenser. The metal is therefore drained from the cooling troughs because continually sending it through the launders and back to the condenser would cause some cooling if the shut-down lasted long enough.

During the shut-down the metal in the condenser cools somewhat, so that on re-starting the metal is colder than usual.

When re-starting the flow of metal after a furnace shut-down, therefore, the level of the metal is adjusted to lie below the upper level of the cement base 3, e. g. at the level indicated by 7 (Figure 1). This is done by removing the spade (Figures 6 and 7) so that the level of the entering metal is below that of the water jackets.

In this way, although the molten metal flowing through the launders is not at its equilibrium temperatures, the absence of watercooling compensates for this, and the liquid metal does not solidify. Similarly, if the molten metal before entering the trough is below its normal temperature but still requires some cooling, the T-spade can be adjusted so as to reduce the height of the molten metal and thus reduce the area of heat transfer to the water jackets or removed.

This state of affairs may happen for instance at such times during furnace operation, particularly when the furnace is operating at a low rate, when not much heat is being supplied to the metal in the condenser; sometimes, on such occasions, the level of the metal in the trough is reduced, so as to obtain little or no cooling.

After a shut-down for repairs to the trough or to the surrounding apparatus (2, 3, 4) these repairs can be effected rapidly by arranging that only a small part of the system containing the fault need be removed.

During such a shut-down, if the furnace is still operating, the metal in the condensers, being deprived of its means of cooling, will become hotter than normal. One advantage of having a cooling system that can be rapidly repaired is that the furnace can meanwhile be kept running without causing the metal in the condenser to become excessively hot. When the cooling system has been repaired, it can immediately be put into normal operation; at first the metal will be too hot, so that the level of the metal flowing in the trough may at first be set somewhat higher than normal, to take out extra heat.

It is for this reason that the water cooling device and the steel plating are made up in sections. When one of the cooling jackets 2 has to be replaced, the inlet and outlet water pipes 16 (Figure 4) attached to the jacket are removed, the bolt 15 is unscrewed and the water jacket, which is not secured to the flanges or otherwise than by the bolt 15 to the steel plate, is removed.

When it is desired to remove one entire section, consisting of sections 2 and 4, and part of the cement base 3, the pipes 16 are removed from the water jacket, the flanges 5 at the ends of the sections are unscrewed, and the part of the cement base lying directly underneath the water jacket may be broken through at the ends if desired. The water jacket is left attached to the steel plate 4 by the bolt 15. As the arrangement in sections of the water coolers and the steel plate is designed deliberately to enable a part only, and not the whole, of the system to be removed, it is advantageous to make each section as small as is consistent with avoiding engineering troubles, e. g. a superfluity of water inlet and outlet pipes.

The trough form of cooling, in which so much more of the surface area of the metal is in contact with cooling devices than in the pipe form mentioned above, has resulted in greater heat transfer, and has therefore enabled the water containers or jackets to be made thicker than the pipes used in the other form of cooling. This has resulted in less leakage of the water coolers.

The preferred form of trough described has the advantage over a type in which the cooling section is at the bottom, that in the preferred form the molten metal, if it is below its equilibrium temperature when entering the trough, need not be exposed at any part of it to cooling, while in the other design the lower section of the metal is exposed to cooling and solidifies. This solid metal forms a floor over which liquid metal could pass, this liquid metal being in the upper non-cooled portion, and the solid metal is gradually melted by the passage of molten metal, but there is always a certain amount of inconvenience due to this solid block. The preferred form prevents this congealing by arranging for the liquid metal not to be exposed to cooling at all when starting up, or when for other reasons the liquid metal should not be cooled.

Also the preferred form of the trough cooling system has been made still more efficient as regards heat transfer than the other form mentioned, and another possible form in which water cooling extends from top to bottom of the trough, and has enabled the level of the metal in the trough to be reduced, so that the same amount of cooling is obtained for less area of heat transfer. This has contributed still further to the absence of leakage in the water coolers which, as was mentioned above, is a disadvantage of the pipe form.

Various modifications may be made within the scope of the invention.

Thus while water-cooling has been referred to it is to be understood that any other convenient coolant fluid might be used such as a fusible metal. Also when water-cooling is used the water is not necessarily at atmospheric pressure but might be at a higher pressure such as that of a boiler.

I claim:

1. A trough or launder for cooling molten metals, comprising a trough of rigid construction, a base of cement or like material of low thermal conductivity within the lower part of the trough, and a fluid cooling device on the inside of the trough above the cement base.

2. A trough or launder as claimed in claim 1, in which fluid cooling devices are provided on both sides of the trough.

3. A trough or launder as claimed in claim 1, in which the trough is formed of sections having end flanges for bolting adjacent sections together.

4. A trough or launder as claimed in claim 2, in which each fluid cooling device is detachable.

5. A trough or launder comprising a plurality of trough sections of steel plate secured together by means of end flanges, a base of cement material of low thermal conductivity extending within the lower part of the trough, and fluid cooling devices on the inside of the trough above the level of the cement base.

6. A trough or launder as claimed in claim 1, in which control means are provided for the trough for regulating the depth of metal in the trough, whereby the amount of molten metal in the trough in contact with said fluid cooling device may be varied.

7. A method of separating molten metals in solution which comprises passing the solution of molten metals through a trough, heat insulating the molten metal in the lower portion of the trough, cooling predetermined sections of the upper portion of the trough with which the molten metal is in contact to thereby cool the molten metal in the upper portion of the trough, introducing the molten metal passing through the trough into a quiescent zone to permit stratification of the metals of the solution, and removing metal from at least one of the layers.

8. A method of separating molten metals as set forth in claim 7 in which the height of the molten metal in the trough is varied with respect to the cooled section of the trough to control the amount thereof which is subjected to cooling.

9. In a method for the production of zinc comprising condensing zinc by shock-chilling a gaseous mixture containing zinc vapor with a shower of molten lead and thereby obtaining a solution of zinc in lead, and separating zinc from said solution by cooling the solution to a temperature at which zinc separates from solution in lead but above the monotectic temperature (418° C.) for a lead zinc solution, the improvement in separating zinc from the solution of zinc in lead which comprises passing said solution through a trough, heat insulating the lower portion of the trough, cooling predetermined sections of the upper portion of the trough with which the metal is in contact to thereby cool the molten metal, introducing the molten metal passing through the trough into a quiescent zone, maintaining the molten metal in said quiescent zone for a length of time sufficient to permit separation of zinc from said solution and removing the separated zinc.

10. The improvement according to claim 9 wherein cooling of the solution of zinc in lead is controlled by adjusting the level of the solution in the trough.

References Cited in the file of this patent

UNITED STATES PATENTS

| | | |
|---|---|---|
| 679,965 | Von Holdt | Aug. 6, 1901 |
| 1,323,253 | De Lavaud | Dec. 2, 1919 |
| 1,776,548 | Carrington | Sept. 23, 1930 |
| 1,796,644 | Carrington | Mar. 17, 1931 |
| 2,688,047 | Robson et al. | Feb. 2, 1954 |